US012482402B2

(12) United States Patent
Kim et al.

(10) Patent No.: US 12,482,402 B2
(45) Date of Patent: Nov. 25, 2025

(54) HYBRID INITIALIZATION FOR A FLICKER-FREE VARIABLE REFRESH RATE ENABLED DISPLAY

(71) Applicant: DELL PRODUCTS L.P., Round Rock, TX (US)

(72) Inventors: Daehyun Kim, Singapore (SG); Seungjoo Choi, Singapore (SG); KyoungJun Kim, Singapore (SG)

(73) Assignee: Dell Products L.P., Round Rock, TX (US)

( * ) Notice: Subject to any disclaimer, the term of this patent is extended or adjusted under 35 U.S.C. 154(b) by 36 days.

(21) Appl. No.: 18/426,666

(22) Filed: Jan. 30, 2024

(65) Prior Publication Data

US 2025/0246116 A1 Jul. 31, 2025

(51) Int. Cl.
*G09G 3/20* (2006.01)

(52) U.S. Cl.
CPC ....... *G09G 3/2096* (2013.01); *G09G 2310/08* (2013.01); *G09G 2320/0247* (2013.01); *G09G 2340/0435* (2013.01)

(58) Field of Classification Search
CPC .................................................. G09G 2310/08
See application file for complete search history.

(56) References Cited

U.S. PATENT DOCUMENTS

| | | | | |
|---|---|---|---|---|
| 11,676,554 | B2 | 6/2023 | Huang et al. | |
| 2008/0100598 | A1 | 5/2008 | Juenger | |
| 2018/0061311 | A1* | 3/2018 | Lin | G09G 3/3291 |
| 2022/0197588 | A1 | 6/2022 | Lei et al. | |
| 2023/0245629 | A1 | 8/2023 | Ko et al. | |

* cited by examiner

*Primary Examiner* — Gustavo Polo
(74) *Attorney, Agent, or Firm* — Larson Newman, LLP

(57) ABSTRACT

A display device includes a display panel configured to display an image, and a timing controller configured to operate the pixels of the display panel at a first refresh rate and a second refresh rate. An integrated circuit detects a variation between a first frequency corresponding to a first refresh rate and a second frequency corresponding to a second refresh rate. If the frequency variation between the first frequency and the second frequency is greater than a first threshold, then a gray level of a portion of the image is determined. If the gray level of the portion of the image is less than a second threshold, then a frequency of a first frame to a greater frequency between the first frequency and the second frequency.

20 Claims, 5 Drawing Sheets

HYBRID INITIALIZATION FOR A FLICKER-FREE VARIABLE REFRESH RATE ENABLED DISPLAY

FIELD OF THE DISCLOSURE

The present disclosure generally relates to information handling systems, and more particularly relates to hybrid initialization for a flicker-free variable refresh rate enabled display.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A display device includes a display panel configured to display an image, and a timing controller configured to operate the pixels of the display panel at a first refresh rate and a second refresh rate. An integrated circuit detects a variation between a first frequency corresponding to a first refresh rate and a second frequency corresponding to a second refresh rate. If the frequency variation between the first frequency and the second frequency is greater than a first threshold, then a gray level of a portion of the image is determined. If the gray level of the portion of the image is less than a second threshold, then a frequency of a first frame to a greater frequency between the first frequency and the second frequency.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
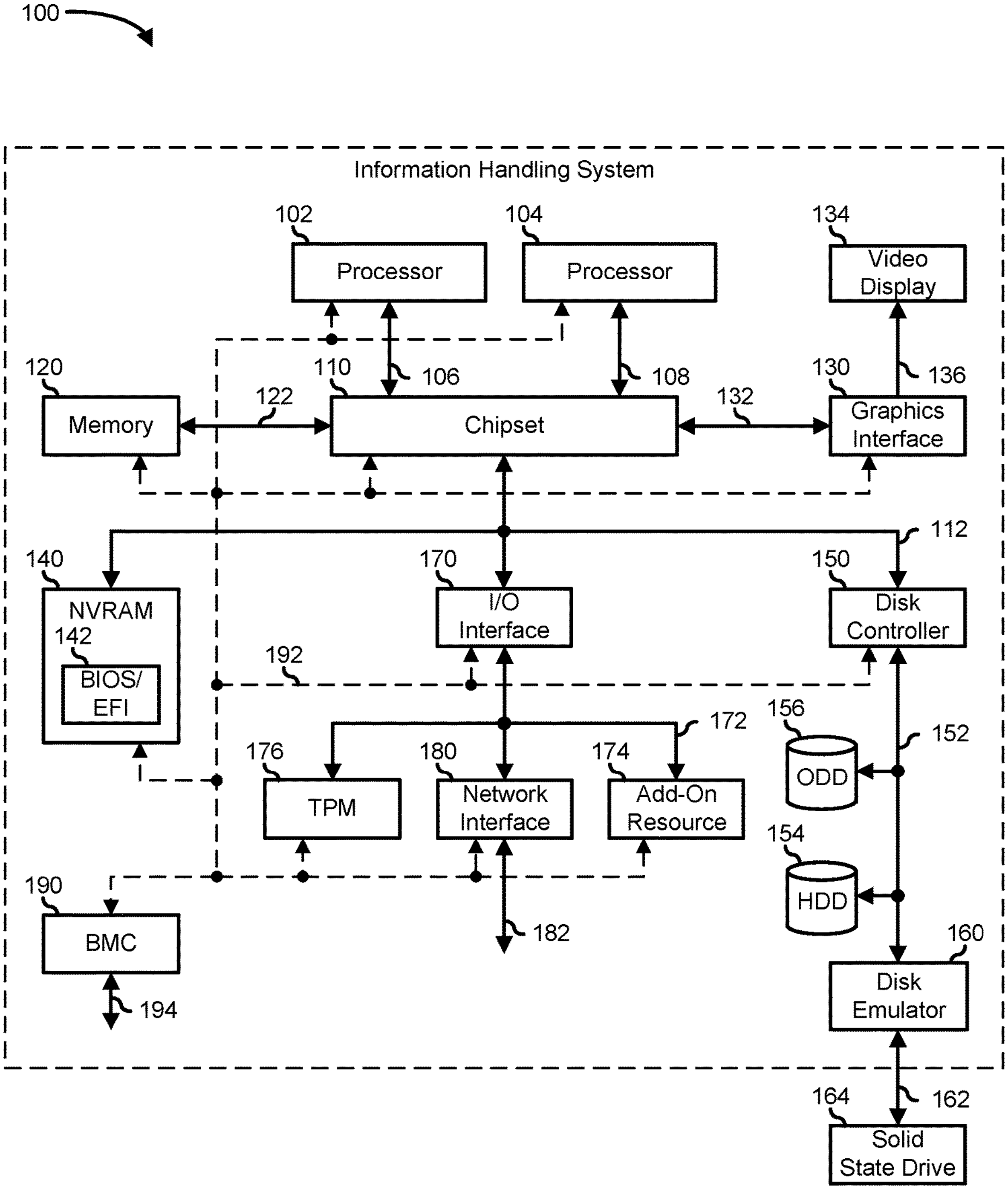
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board, or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172 and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device, a BMC may be referred to as an embedded controller (EC). A BMC included in a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Enterprise, a Dell EMC OpenManage Server Administrator (OMSA) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Display devices, also referred to herein as displays, often have a variety of refresh rates so that visual images appear to the human eye to have natural motion. In addition, high-end displays that support gaming applications frequently have rapid refresh rates to help present visual images with as little distortion or ghosting as possible. To achieve this, some graphics processing units (GPUs) include the ability to command a variable refresh rate enabled display to vary its refresh rate. However, variable refresh rate-enabled displays typically have flickering issues at dark gray areas of a displayed image. The flickering issues are also worse where there is a big difference between the frequencies of two succeeding refresh rates. These flickering issues generally happen despite the luminance compensation provided. To address these and other concerns, the present disclosure provides a system and method for a hybrid initialization of variable refresh rate-enabled displays.

Figure 2:
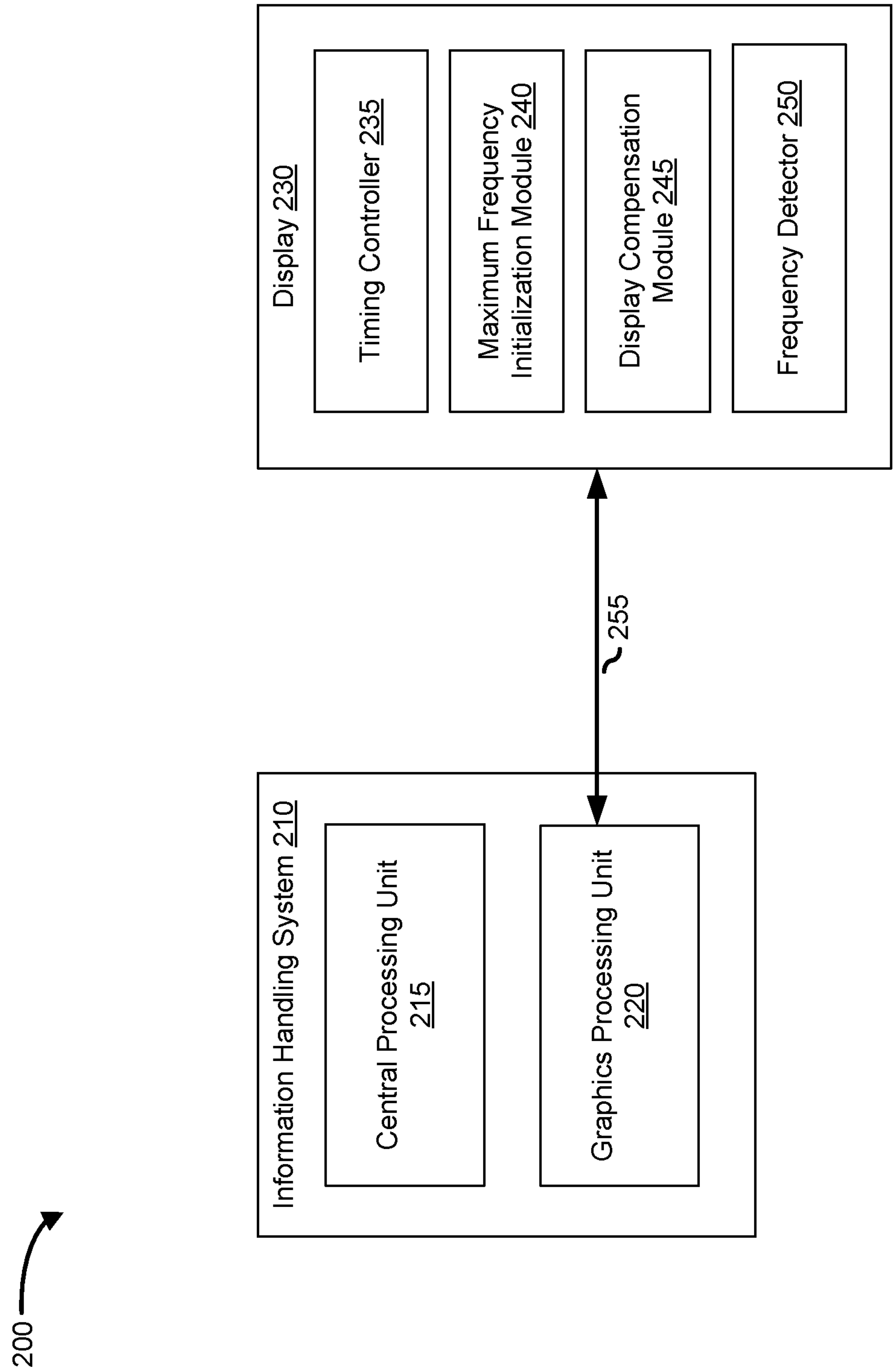
FIG. 2 is a block diagram of a system for hybrid initialization for a flicker-free variable refresh rate enabled display, according to an embodiment of the present disclosure.

FIG. 2 shows a system 200 for hybrid initialization for a flicker-free variable refresh rate enabled display. System 200 includes an information handling system 210 and a display 230. Information handling system 210, which is similar to information handling system 100 of FIG. 1, includes a central processing unit (CPU) 215 and a graphics processing unit (GPU) 220. Display 230 includes a timing controller 235, a maximum frequency initialization module 240, a display compensation module 245, and a frequency detector 250. The components of system 200 may be implemented in hardware, software, firmware, or any combination thereof. For example, one or more maximum frequency initialization module 240, display compensation module 245, and frequency detector 250 may be included in at least one processor, such as a microprocessor and/or an integrated circuit. In addition, the components shown are not drawn to scale, and system 200 may include additional or fewer components. In addition, connections between components may be omitted for descriptive clarity.

CPU 215 may be configured to execute instructions, such as from an operating system or an application. For example, CPU 215 may be configured to generate visual information for display at display 230. In particular, the visual information may be used to generate visual content, such as an image, a video frame, etc. CPU 215 may provide the visual information to GPU 220 which further processes the information to generate pixel values that define the presentation of visual content. For example, GPU 220 may communicate the pixel values to timing controller 235 and/or a scalar unit. GPU 220 may also adjust and communicate the refresh rate to timing controller 235, the scalar unit, and/or frequency detector 250 based on the frame rate of the visual information or the visual content currently displayed. For example, GPU 220 may communicate the information via an interface 255 which can be an $I^2C$ communication channel between information handling system 210 and display 230. However, any variety of connections between information handling system 210 and display 230 are envisioned as falling within the scope of the present disclosure. For example, interface 255 can be DVI connection, an HDMI connection, or similar.

Display 230 may be a light-emitting diode (LED) display, an organic LED (OLED) display, a quantum dot OLED (QD-OLED), a liquid crystal display (LCD), etc. Display 230 may be an external display device from information handling system 210. For example, display 230 may be a computer desktop monitor. Display 230 may be integrated into information handling system 210, such as wherein information handling system 210 is a laptop, tablet, 2-in-1 convertible device, mobile device, or similar. Display 230 may be configured to support a variable refresh rate range, such as from 30 hertz (Hz) to 300 Hz. The refresh rate of the display can vary continuously within this range. In one embodiment, the variable refresh rate function is enabled by default. However, with frequent changes in the refresh rate, flicker issues generally happen due to the deviation in luminance. For example, the luminance at a frequency of 87.5 Hz may be 0.020 nits while the luminance at a frequency of 175 Hz may be 0.0007 nits.

Display compensation module 245 may be configured to compensate for luminance provided by the pixels so that a visual content presented at display 230 has the luminance and depth intended by the application that defined the visual information. Display compensation module 245 may also execute a compensation function to reduce the luminance deviation at different frequencies, which can then reduce the flicker issue. The compensation function can be performed to reduce the luminance gap when the refresh rate shifts from one refresh rate to a second refresh rate. For example, the luminance of display 230 at 240 Hz may be 27 nits and the luminance of the next refresh rate can be 26.2 nits. There is a luminance gap of 1.2 nits which may cause flicker. The compensation function may reduce the luminance of display 230 at 240 Hz to 26, reducing the luminance gap from 1.2 nits to 0.2 nits. The reduction of the luminance gap may prevent undesired flicker in visual images presented at display 230.

Display compensation module 245 may use a compensation value to adjust the voltage initialization value of certain pixels. The compensation values may be used to adjust the luminance of the pixels in display 230 based on the refresh rate to decrease the luminance gap that typically occurs at different frequencies. This is because the luminance gap may be perceived by an end user as a flicker. Thus, decreasing the luminance gap may address the flicker issue. For example, display compensation module 245 may apply a voltage initialization value such that the gap associated with the luminance at a frequency of 175 Hz and the luminance at a frequency of 87.5 Hz may be reduced. The compensation values may be stored in a lookup table that is accessible by display compensation module 245.

The aforementioned luminance at different refresh rates and associated compensation values may have been determined during calibration during the design and/or manufacture of display 230. The compensation values may be dependent on the frequency of the refresh rate. Accordingly, compensation values associated with one refresh rate may not apply to another refresh rate. The compensation values may be stored in one or more lookup tables. A lookup table may be stored in a random access memory. In one example, the lookup table may include compensation values for various refresh rates supported by display 230, such as 60 Hz, 80, Hz, 100 Hz, 140, Hz, 240 Hz, etc.

Frequency detector 250 may be a circuit or logic configured to detect a refresh rate selected for a frame and communicate the refresh rate to timing controller 235, maximum frequency initialization module 240, and display compensation module 245. Frequency detector 250 may also be configured to detect a frequency variation of the refresh rates. Maximum frequency initialization module 240 may determine whether to perform the initialization of the first frame to the maximum frequency based on at least two factors: a) frequency variation between a first refresh rate and a second refresh rate, and b) gray level of the displayed content. If both the frequency variation and the gray level each exceed their thresholds, then display compensation module 245 may perform the initialization of a first frame which is typically associated with a delay with the transition from one frequency to another frequency. Otherwise, maximum frequency initialization module 240 may refrain from the initialization of the first frame.

Those of ordinary skill in the art will appreciate that the configuration, hardware, and/or software components of system 200 depicted in FIG. 2 may vary. For example, the illustrative components within system 200 are not intended to be exhaustive but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

One or more of maximum frequency initialization module 240, display compensation module 245, and frequency detector 250 may be included in the scaler unit, timing controller 235, or both. For example, maximum frequency initialization module 240, display compensation module 245, and frequency detector 250 may all be included in the scaler unit. In another example, frequency detector 250 may be included in timing controller 235 while maximum frequency initialization module 240, display compensation module 245, and frequency detector 250 may be included in the scaler unit. Various combinations of the aforementioned configuration may be appreciated by one of ordinary skill in the art without limiting the present disclosure.

Figure 3:
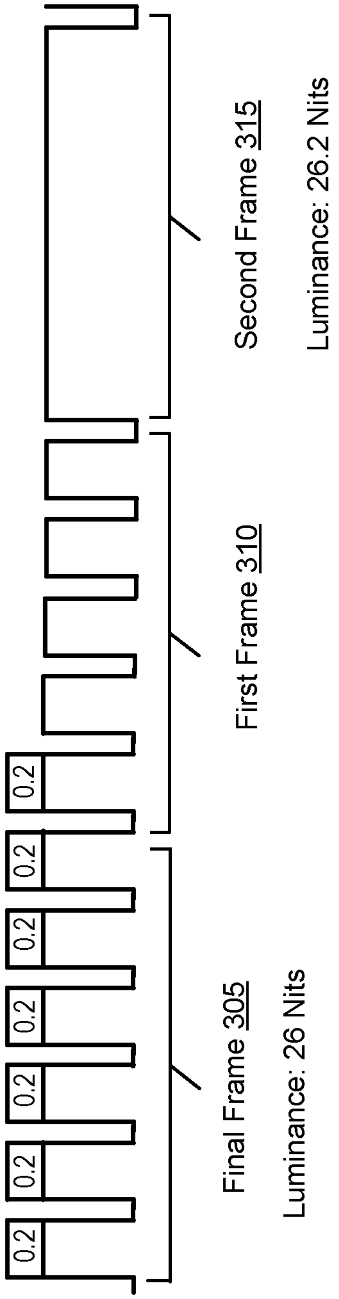
FIG. 3 is a diagram of several frames associated with hybrid initialization for a flicker-free variable refresh rate enabled display, according to an embodiment of the present disclosure.

FIG. 3 shows a diagram of several frames which includes a final frame 305, a first frame 310, and a second frame 315. In this example, the refresh rate may transition from a current refresh rate to a next refresh rate. The frequency of the current refresh rate is different from the frequency of the next refresh rate. For example, the current refresh rate is 240 Hz while the next refresh rate is 48 Hz. Final frame 305 may be the last frame of the current refresh rate prior to the transition to the second refresh rate. The transition between the current refresh rate frequency and the next refresh rate frequency may include a frame delay after final frame 305. First frame 310 may represent the frame delay during the transition. Second frame may be the "first frame" that is associated with the next refresh rate.

In this example, final frame 305 is associated with a luminance of 26 nits while second frame 315 is associated with a luminance of 26.2 nits. Accordingly, there is a luminance gap of 0.2 nits between the two frames. As such, display compensation module 245 may have applied compensation values such that the gap between the two luminance values is less than one nit. To maintain the relatively small luminance gap between first frame 310 and second frame 315, at first frame 310, maximum frequency initialization module 240 of FIG. 2 may initialize the frequency of first frame 310 to a maximum frequency between the current refresh rate and the next refresh rate, wherein the difference between the current refresh rate and the next refresh rate is greater than a threshold. In this example, first frame 310 is updated to 240 Hz of the current refresh rate frequency which is larger than 48 Hz of the next refresh rate frequency and the variance between the two frequencies is greater than the threshold. Maximum frequency initialization module 240 may refrain from applying compensation values to first frame 310. This is to avoid increasing the luminance gap between first frame 310 and second frame 315. At second frame 315, the next refresh rate frequency is applied.

Because the number of waveforms and accordingly the number of peaks and valleys in each frame is different from the first refresh rate to the second refresh rate, compensation values may be different between the two refresh rates. To compensate for the gap in the luminance, the number of waveforms in each frame is typically taken into account. In addition, based on the number of waveforms, the number of peaks and valleys of the waveforms may also be accounted for and compensated for. In addition, because of frame delay, the frequency of the refresh rate when transitioning from the first refresh rate to the second refresh rate may be different from the two refresh rates. Thus, applying the compensation values associated with final frame 305 to first frame 310 may increase the luminance gap between first frame 310 and second frame 315 instead of decreasing it. This, in turn, may increase the flicker issue.

Accordingly, maximum frequency initialization module 240 may initialize the frequency of the first frame to a maximum between the first refresh rate and the second refresh rate. However, maximum frequency initialization module 240 may refrain from applying luminance compensation for the first frame. Based on the example above, if the first refresh rate is 240 Hz and the second refresh rate is 48 Hz, then maximum frequency initialization module 240 may initialize the refresh rate of the first frame to 240 Hz as depicted in FIG. 3.

Figure 4:
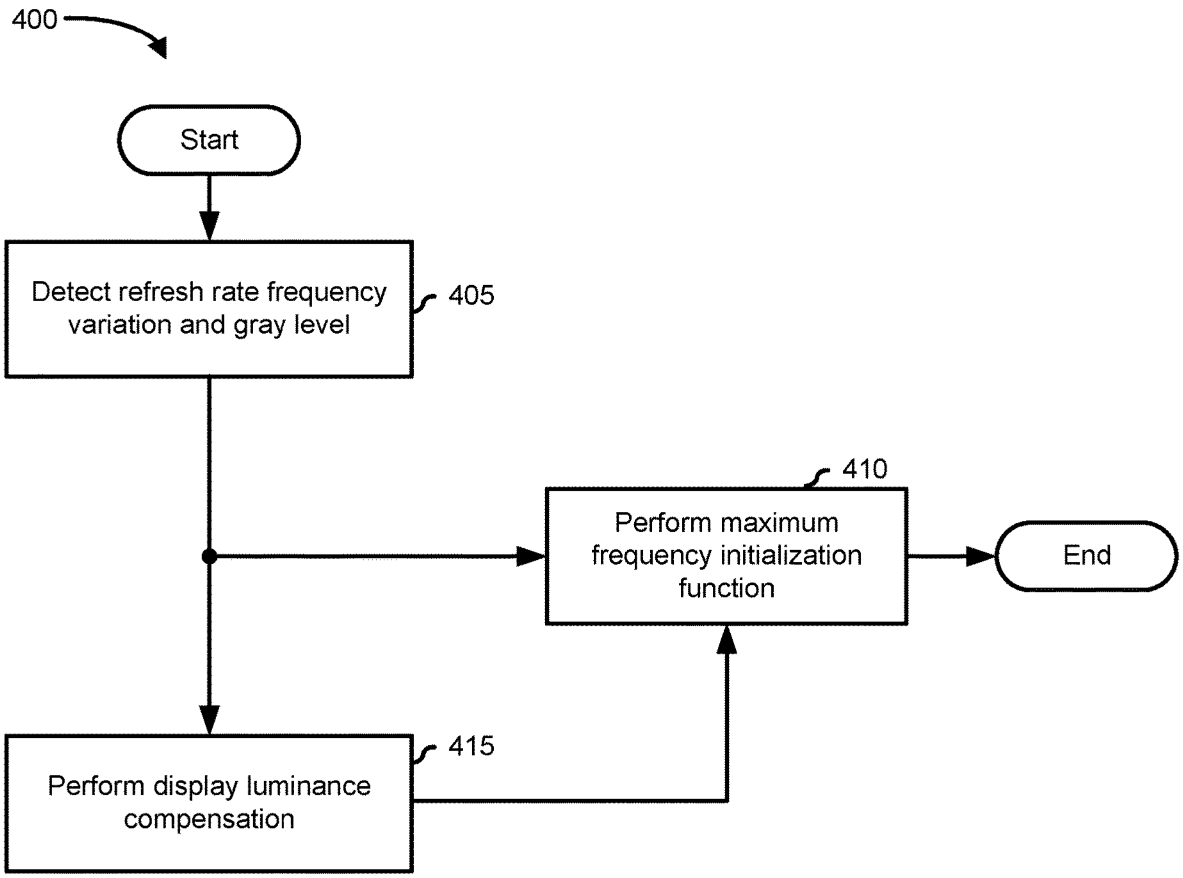
FIG. 4 is a flowchart of a method for a hybrid initialization for a flicker-free variable refresh rate enabled display, according to an embodiment of the present disclosure.

FIG. 4 shows a flowchart of a method 400 for a hybrid initialization for a flicker-free variable refresh rate-enabled display. Method 400 may be performed by any suitable component including, but not limited to, system 200 of FIG. 2 including components thereof. While embodiments of the present disclosure are described in terms of system 200 of FIG. 2, it should be recognized that other systems may be utilized to perform the described method.

Method 400 typically starts at block 405 wherein frequency detector 250 and/or timing controller 235 may detect a frequency variation, such as from the current frequency to the next frequency. For example, GPU 220 may transmit a first refresh rate and a second refresh rate to frequency detector 250 and/or timing controller 235. Frequency detector 250 and/or timing controller 235 may monitor the refresh rates to determine if there is a variation between the current refresh rate and the next refresh rate. Timing controller 235 may also be configured to determine a gray level of one or more pixels associated with the content currently displayed.

Figure 5:
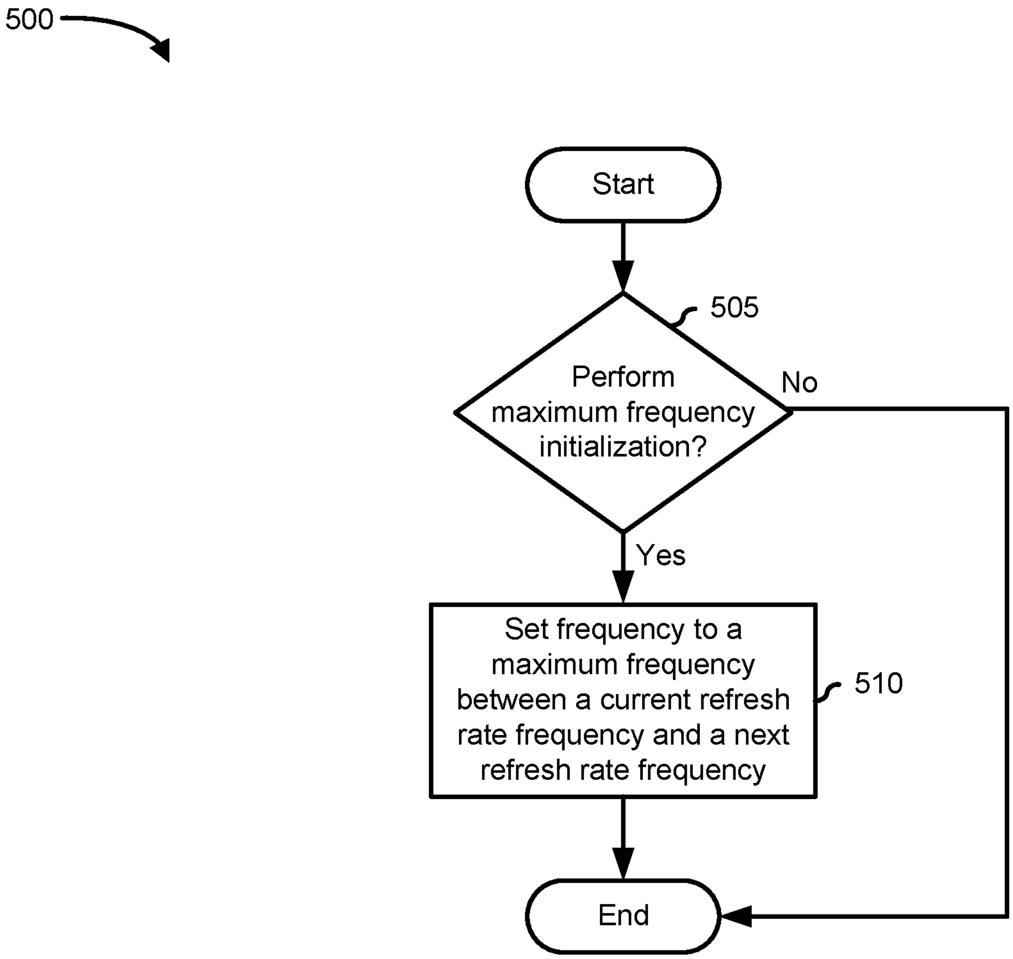
FIG. 5 is a flowchart of a method for maximum frequency initialization of a frame, according to an embodiment of the present disclosure.

The method may proceed to block 410 where maximum frequency initialization module 240 may initialize a frame to a maximum frequency between the current frequency and the next frequency, which is illustrated in further detail by a method 500 of FIG. 5. The method may also proceed in parallel to block 415 where display compensation module 245 may apply compensation values to adjust the luminance of the content displayed or a portion thereof. In particular, the compensation values may be used to reduce the luminance of one or more pixels associated with the aforementioned content or the portion thereof. The reduction of the luminance may decrease the deviation between the luminance associated with the two aforementioned frequencies. Block 415 may be applied to the last frame of the first refresh rate, while block 410 may be applied to a frame after the last frame. Further, display compensation module 245 may refrain from applying the compensation value to a frame associated with the second refresh rate subsequent to the last frame of the first refresh rate. Accordingly, the method may proceed to block 410. Afterwards, the method ends.

FIG. 5 shows a flowchart of method 500 for the maximum frequency initialization of a frame. Method 500 illustrates block 410 in further detail. Method 500 may be performed by any suitable component of system 200 of FIG. 2 including, but not limited to, maximum frequency initialization module 240. While embodiments of the present disclosure are described in terms of system 200 of FIG. 2, it should be recognized that other systems may be utilized to perform the described method.

Method 500 typically starts at decision block 505 wherein maximum frequency initialization module 240 may determine whether to perform a maximum frequency initialization for the first frame of the next refresh rate. Maximum frequency initialization may be performed where there is a high-frequency variation and when the gray level of one or more pixels is identified as dark. In one example, the high-frequency variation may occur when the deviation between the frequency of a current refresh rate and the next refresh rate is greater than a particular threshold, such as 50 Hz. The threshold may be set at a different value, such as 80 Hz. In one example, the gray level may be deemed dark if it is less than 20 nits. The gray level may also be deemed dark if the gray level is a different value, such as 30 nits.

The threshold and the value of the gray level to be identified as dark may be adjusted at manufacture or by an information technology administrator. If the method determines that the maximum frequency initialization function is to be performed, then the "YES" branch is taken, and the method proceeds to block 510. If the method determines that the maximum frequency initialization function is not to be performed, then the "NO" branch is taken, and the method ends. Accordingly, both thresholds may have to be met prior to performing block 510.

For example, if the frequency variation between the current frequency and the next frequency is not greater than the first threshold, then maximum frequency initialization module 240 may be refraining from initializing the frequency of a first frame of the next frequency. In another example, if the frequency variation between the current frequency and the next frequency is greater than the first threshold, then maximum frequency initialization module 240 may determine a gray level of a portion of the displayed content. If the gray level of the portion of the displayed content is not less than a second threshold, then maximum frequency initialization module 240 may refrain from initializing the frequency of the first frame of the next frequency.

At block 510, maximum frequency initialization module 240 may perform maximum frequency initialization, wherein it may initialize the first frame to have a maximum frequency between the aforementioned first frequency and the second frequency. For example, if the first frequency of the current refresh rate is 240 Hz and the second frequency of the next refresh rate is 48 Hz, the maximum frequency initialization module 240 may set the frequency of the first frame of the next refresh rate to 240 Hz. Maximum frequency initialization module 240 may trigger timing controller 235 of FIG. 2 to set the frequency of the first frame to a greater frequency. Maximum frequency initialization module 240 may refrain from applying compensation values at this time. Subsequently, the method ends.

Although FIG. 4, and FIG. 5 show example blocks of method 400 and method 500 in some implementations, method 400 and method 500 may include additional blocks, fewer blocks, different blocks, or differently arranged blocks than those depicted in FIG. 3 and FIG. 4. Those skilled in the art will understand that the principles presented herein may be implemented in any suitably arranged processing system. Additionally, or alternatively, two or more of the blocks of method 400 and method 500 may be performed in parallel. For example, blocks 410 and 415 of method 400 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:

detecting, by a processor, a variation between a first frequency corresponding to a first refresh rate and a second frequency corresponding to a second refresh rate of a display;

if the variation between the first frequency of the first refresh rate and the second frequency of the second refresh rate is greater than a first threshold, then determining a gray level of a portion of a content of the display;

if the gray level of the portion of the content is less than a second threshold, then initializing a first frame of the second refresh rate to a greater frequency between the first frequency and the second frequency; and if the variation between the first frequency and the second frequency is not greater than the first threshold, then refraining from the initializing of the first frame.

2. The method of claim 1, wherein the first threshold is at least fifty hertz.

3. The method of claim 1, wherein the second threshold is at least twenty nits.

4. The method of claim 1, further comprising applying a compensation value to a last frame of the first refresh rate.

5. The method of claim 1, further comprising refraining from applying a compensation value to the first frame of the second refresh rate.

6. The method of claim 1, further comprising performing maximum frequency initialization.

7. The method of claim 1, further comprising if the variation between the first frequency and the second frequency is greater than the first threshold and the gray level of the content not less than the second threshold, then refraining from the initializing of the first frame to the greater frequency between the first frequency and the second frequency.

8. The method of claim 7, further comprising refraining from applying a compensation value to a second frame associated with the second refresh rate.

9. A display device, comprising:

a display panel configured to display an image, the display panel including a plurality of pixels; and a timing controller configured to operate the pixels of the display panel at a first refresh rate and a second refresh rate; and an integrated circuit configured to:

detect a variation between a first frequency corresponding to the first refresh rate and a second frequency corresponding to the second refresh rate;

if the variation between the first frequency and the second frequency is greater than a first threshold, then determine a gray level of a portion of the image;

if the gray level of the portion of the image is less than a second threshold, then initialize a first frame of the second refresh rate to a greater frequency between the first frequency and the second frequency; and refrain from the initialization of the first frame of the second refresh rate if the variation between the first frequency and the second frequency is not greater than the first threshold.

10. The display device of claim 9, wherein the first threshold is at least fifty hertz.

11. The display device of claim 9, wherein the second threshold is at least twenty nits.

12. The display device of claim 9, wherein the integrated circuit is further configured to apply a compensation value to a last frame of the first refresh rate.

13. The display device of claim 9, wherein the integrated circuit is further configured to refrain from applying a compensation value to the first frame of the second refresh rate.

14. The display device of claim 9, wherein the integrated circuit is further configured to perform maximum frequency initialization.

15. The display device of claim 9, wherein the integrated circuit is further configured to refrain from the initialization of the first frame of the second refresh rate if the variation between the first frequency and the second frequency is greater than the first threshold and the gray level of the image not less than the second threshold.

16. The display device of claim 9, wherein the integrated circuit is further configured to refrain from applying a compensation value to a second frame associated with the second refresh rate.

17. An information handling system comprising:

a graphics processing unit configured to transmit visual information to a display device; and the display device further comprising:

a display panel configured to display an image, the display panel including a plurality of pixels; and a timing controller configured to operate the pixels of the display panel at a first refresh rate and a second refresh rate; and an integrated circuit configured to:

detect a variation between a first frequency corresponding to the first refresh rate and a second frequency corresponding to the second refresh rate;

if the variation between the first frequency and the second frequency is greater than a first threshold, then determine a gray level of the image;

if the gray level of the image is less than a second threshold, then initialize a first frame of the second refresh rate to a greater frequency between the first frequency and the second frequency; and refrain from the initialization of the first frame of the second refresh rate if the variation between the first frequency and the second frequency is not greater than the first threshold.

18. The information handling system of claim 17, wherein the integrated circuit is further configured to apply a compensation value to a last frame of the first refresh rate.

19. The information handling system of claim 17, wherein the integrated circuit is further configured to refrain from applying a compensation value to the first frame of the second refresh rate.

20. The information handling system of claim 17, wherein the integrated circuit is further configured to perform maximum frequency initialization.

* * * * *